US009125067B2

(12) United States Patent
Alles et al.

(10) Patent No.: US 9,125,067 B2
(45) Date of Patent: Sep. 1, 2015

(54) SYSTEM AND METHOD FOR MOBILE LOCATION USING RANKED PARAMETER LABELS

(71) Applicant: Andrew, LLC, Hickory, NC (US)

(72) Inventors: Martin Alles, Vienna, VA (US); Suryanarayana Kalenahalli, Chantilly, VA (US)

(73) Assignee: CommScope Technologies LLC, Hickory, NC (US)

( * ) Notice: Subject to any disclaimer, the term of this patent is extended or adjusted under 35 U.S.C. 154(b) by 308 days.

(21) Appl. No.: 13/758,487

(22) Filed: Feb. 4, 2013

(65) Prior Publication Data

US 2013/0203423 A1    Aug. 8, 2013

Related U.S. Application Data

(60) Provisional application No. 61/594,641, filed on Feb. 3, 2012.

(51) Int. Cl.
| | |
|---|---|
| H04W 24/00 | (2009.01) |
| H04W 16/18 | (2009.01) |
| G01S 1/02 | (2010.01) |
| H04W 64/00 | (2009.01) |

(52) U.S. Cl.
CPC .............. H04W 16/18 (2013.01); G01S 1/022 (2013.01); H04W 64/003 (2013.01)

(58) Field of Classification Search
USPC ................. 455/466, 423–424, 456.1–456.6
See application file for complete search history.

(56) References Cited

U.S. PATENT DOCUMENTS

| 6,496,701 | B1 | 12/2002 | Chen et al. |
| 7,295,960 | B2 * | 11/2007 | Rappaport et al. .............. 703/13 |
| 8,170,579 | B2 * | 5/2012 | Alles et al. ................. 455/456.1 |
| 8,406,753 | B2 * | 3/2013 | Alles et al. ................. 455/422.1 |
| 2005/0020278 | A1 * | 1/2005 | Krumm et al. ............. 455/456.1 |
| 2009/0117907 | A1 | 5/2009 | Wigren |

OTHER PUBLICATIONS

Wigren T., "Adaptive Enhanced Cell-ID Fingerprinting Localization by Clustering of Precise Position Measurements," IEEE Transactions on Vehicular Technology, Sep. 2007, vol. 56, Issue 8, pp. 3199-3209.

* cited by examiner

*Primary Examiner* — Brandon Miller
(74) *Attorney, Agent, or Firm* — Duane Morris LLP

(57) ABSTRACT

A system and method for generating a calibration database in a communications network. A grid of geographic locations may be generated to cover a region in a communications network having a plurality of cellular sites. A set of network measurement reports (NMRs) is generated for the region, the NMR being a collection of measurement parameters observed at selected geographic locations in the grid. A label may then be generated representing a first measurement parameter observed from ones of the plural cellular sites at one of the selected geographic locations, the label including a relative ranking by cellular site of the first measurement parameter. Using this generated label, a calibration database for the communications network may be populated and locations of mobile devices determined therefrom.

22 Claims, 7 Drawing Sheets

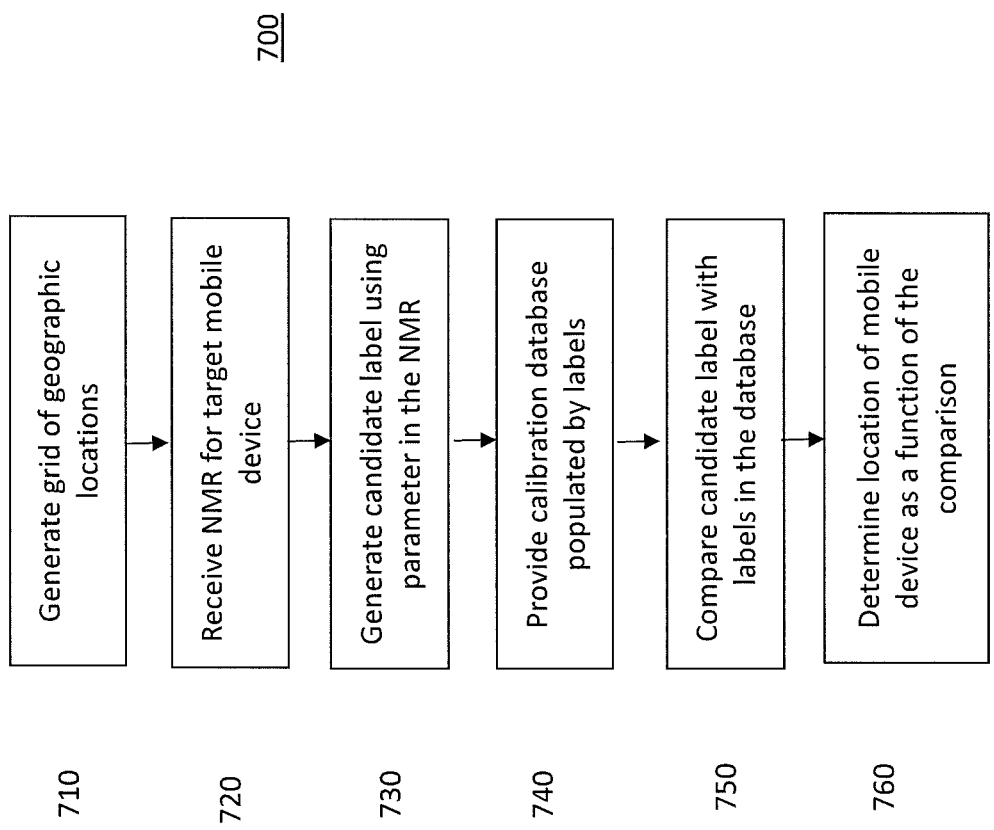

SYSTEM AND METHOD FOR MOBILE LOCATION USING RANKED PARAMETER LABELS

CROSS REFERENCES

The present application claims the priority benefit of the provisional application entitled, "System and Method for Mobile Location Using Ranked Parameter Labels," Application Ser. No. 61/594,641, filed on Feb. 3, 2012 the entirety of which is incorporated herein by reference.

BACKGROUND

The present subject matter is directed generally towards a system and method for estimating the location of a wireless mobile device that is in communication with a wireless communications network. Some embodiments of the present subject matter may estimate the location of a wireless mobile device using information from one or more Network Measurement Reports ("NMRs") which may be generated by a wireless communications network or the mobile device.

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which may determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations may include the time of arrival, the angle of arrival, the signal power, or the unique/repeatable radio propagation path (radio fingerprinting) derivable features. In addition, the geolocation systems may also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider. The monitoring of the RF transmissions from the mobile device or wireline interfaces to identify calls of interest is known as "tipping," and generally involves recognizing a call of interest being made from a mobile device and collecting the call setup information. Once the mobile device is identified and the call setup information is collected, the location determining system may be tasked to geolocate the mobile device.

While the above-described systems are useful in certain situations, there is a need to streamline the process in order to efficiently and effectively handle the vast amount of data being sent between the wireless communications network and the large number of mobile devices for which locations are to be determined. In this regard, embodiments of the present subject matter may overcome the limitations of the prior art by estimating the location of a wireless mobile device using Network Measurement Reports ("NMRs") which include calibration data for a number of locations within a geographic region. An NMR may be, in one embodiment, a vector of measurement observations. Embodiments of the present subject matter may provide an accurate location of a mobile device using a variety of observations, measured at the mobile or by the network in relation to the mobile. Exemplary pattern matching schemes may employ these observations and/or associate such observations with a database containing previously made observations and/or synthesized calibration data to determine a location of a mobile device. Exemplary pattern matching schemes may be provided with one or more NMRs or a set of such measurements associated with a mobile device at its unknown location, a calibration database containing previously obtained measurements, predicted measurements, labels associated with such measurements and/or synthesized data indexed to location.

One conventional method of location estimation utilizing NMRs is to compare an NMR from a target mobile device with calibration vectors in a respective measurement database, determine the closest NMR (using some metric), and assign the location of the closest NMR as the location of the NMR for the target mobile device. Such a method, however, provides unacceptable errors, especially when the NMRs contain power measurements, as there may be a large variability in these measurements. This makes reliably locating the target mobile device difficult. Hence, some form of averaging is often desired. Another conventional method of location estimation utilizing NMRs may include dividing the location space (e.g., a region S containing all possible location solutions) in some manner into sub-regions $C_i$. Each sub-region $C_i$, may then be associated with a characterizing vector of measurements or a set of attributes. In this conventional method, by averaging multiple NMRs obtained in each such sub-region $C_i$, location accuracy may be improved. U.S. Pat. No. 6,496,701 to Chen provides such a technique. This technique is generally referred to as a disjoint partitioning of location space into regions or sub-regions $C_i$. For example, Chen describes an explicit disjoint partitioning of a location region (a cell S) into sub-cells $C_i$ using the following relationship to divide the location space into in disjoint regions:

$$S = \Sigma_{i=1}^{m} C_i \qquad (1)$$

This conventional method of dividing location space is not ideal as there is little chance of obtaining characterizing vectors of observed measurements. For example, considering a user of a mobile device located at a window in a building, the act of the user turning around may result in observed measurements becoming dramatically different from signal loss, etc. Further, in a challenging environment such as an urban canyon, if a user travels five to ten feet, observed measurements may dramatically change due to blockage, multipath and/or reflections from the environment. Thus, the prior art is limited in determining the proper sub-cells or sub-regions $C_i$ in such challenging environments.

Another conventional approach described in U.S. Patent Application Publication No. 20090117907 to Wigren and in the publication entitled, "Adaptive Enhanced Cell-ID Fingerprinting Localization by Clustering of Precise position Measurements," September 2007, by Wigren, groups calibration data by similarity. The resulting groups or clusters are analyzed to generate a most likely polygonal shape in the location space. Further, these groups are made in location space and are groupings of measurements with a specified bin size for each measurement of interest. The polygons are determined as a function of their measurements, and the polygons are then used to specify likely areas or regions where one assigns a location for future measurements. Such an approach, however, is limited in determining an accurate location for a target mobile device in challenging environments.

Therefore, there is a need in the art for a system and method to improve location capabilities of a communications system in such environments. In some cases, it may not be possible to completely populate such a calibration database, e.g., in a dense urban environment it may not be possible to physically explore every few meters of every street or building to gather calibration data. Thus, there is also a need to determine whether such non-calibrated regions may be populated with synthetic calibration data whereby such a synthetic calibration database may perform similarly to a database populated with data from calibrated regions. There is also a need in the art to achieve a reasonable degree of location estimation accuracy in dense environments with no prior calibration effort.

SUMMARY

In view of these needs, embodiments of the present subject matter may thus provide a system and method of generating a calibration database in a communications network. The method includes generating a grid of geographic locations to cover a region in a communications network having a plurality of cellular sites, and generating a set of NMRs for the region, the NMR being a collection of measurement parameters observed at selected geographic locations in the grid. The method further includes generating a label representing a first measurement parameter observed from ones of the plural cellular sites at one of the selected geographic locations, the label including a relative ranking by cellular site of the first measurement parameter. A calibration database may then be populated for the communications network using the generated label.

Another embodiment of the present subject matter provides a method of generating a calibration database in a communications network. The method includes generating a grid of geographic locations to cover a region in a communications network having a plurality of cellular sites, and generating a label representing a first parameter between a selected geographic location and ones of the plural cellular sites, the label including a relative ranking by cellular site of the first parameter. The method also includes populating a calibration database for the communications network using the generated label.

A further embodiment of the present subject matter provides a method of determining the location of a mobile device in a communications network. The method includes generating a grid of geographic locations to cover a region in a communications network having a plurality of cellular sites, and receiving an NMR for a target mobile device. A candidate label may then be generated as a function of a first measurement parameter in the received NMR, the candidate label including a relative ranking by respective cellular site of the first measurement parameter. The method also includes providing a calibration database populated by a plurality of labels, each label including a relative ranking by cellular site of actual measurement parameters observed in the region or hypothetical parameters. The candidate label may be compared with ones of the plural database labels, and an estimated location of the mobile device determined as a function of the comparison.

It is an aspect of embodiments of the present subject matter to provide a method of pattern matching using parameter ranked labels and determine the location of a mobile device therefrom. In some embodiments, a calibration database may be created using actual mobile device measurements and using ranked labels. A "label" is a collection of columns, each column serving to rank a particular parameter with respect to a serving and/or neighboring cell site. These columns need not be of the same size. Further, embodiments may provide an option to specify that certain subsets of elements in the respective columns are of equal rank and in such cases a group of elements in a column may be viewed as of equal rank. Thus, embodiments of the present subject matter may provide columns having many groups of elements where each group is of equal rank. It should be noted that the term "label" and "ranked label" may be used interchangeably herein and such use should not limit the scope of the claims appended herewith. In other embodiments, a calibration database may be created or built using synthetic ranked labels. In additional embodiments, uncalibrated regions of a network or calibration database may be populated using such labels and thus partially or even wholly complete the calibration database.

BRIEF DESCRIPTION OF THE DRAWINGS

FIG. 7 is a diagram of a further embodiment of the present subject matter.

DETAILED DESCRIPTION

Figure 1:
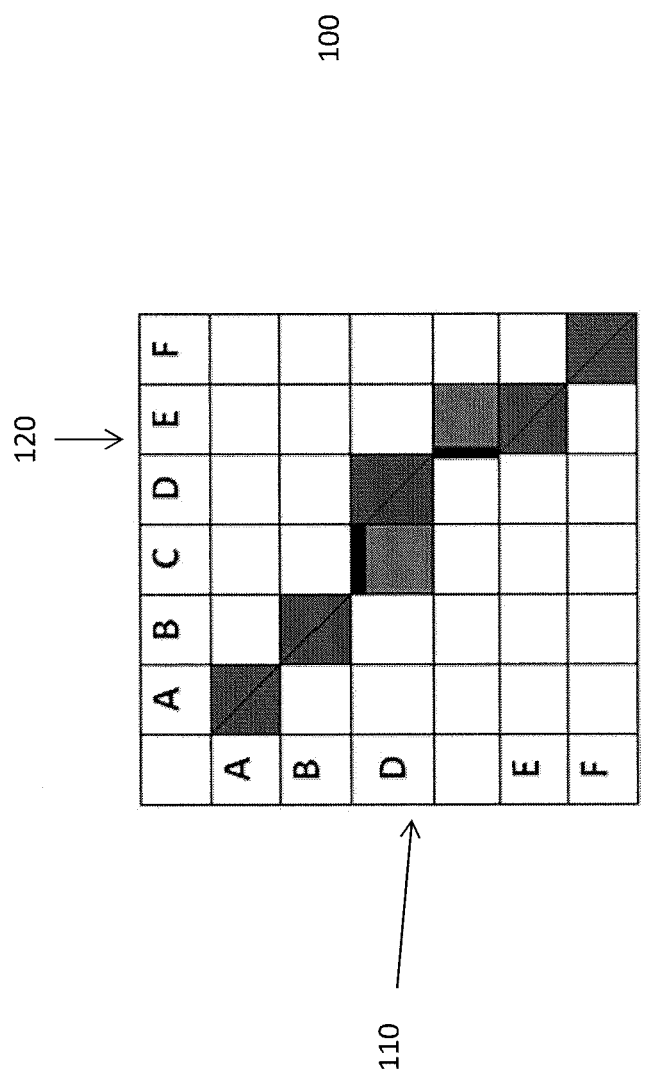
FIG. 1 is an illustration of a cost matrix according to some embodiments of the present subject matter.

With reference to the figures, where like elements have been given like numerical designations to facilitate an understanding of the present subject matter, the various embodiments for a system and method for mobile location using ranked parameter labels are described.

The following description of the present subject matter is provided as an enabling teaching of the present subject matter and its best, currently-known embodiment. Those skilled in the art will recognize that many changes may be made to the embodiments described herein while still obtaining the beneficial results of the present subject matter. It will also be apparent that some of the desired benefits of the present subject matter may be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed towards or references specific telecommunications systems, it is to be understood that the discussion is not intended to limit the scope of the present subject matter in any way and that the principles presented are equally applicable to other communications networks, systems and associated protocols.

Those skilled in the art will appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto. In addition, it is possible to use some of the features of the present subject matter without the corresponding use of the other features. Accordingly, the foregoing description of exemplary or illustrative embodiments is provided for the purpose of illustrating the principles of the present subject matter and not in limitation thereof and may include modification thereto and permutations thereof. The terms "device," "handset," "terminal," and "station" are utilized interchangeably through the present disclosure and such use is not intended to limit the scope of the claims appended herewith. It should also be noted that the terms "node(s)" and "site(s)" and "station(s)" are also utilized interchangeably through the present disclosure and such use is not intended to limit the scope of the claims appended herewith.

Embodiments of the present subject matter may be provided with information regarding active base stations, nodes or sites in an exemplary wireless communications network, including but not limited to the location of each such base station or cellular site. While embodiments herein may generally refer to wireless network systems, the claims appended herewith are applicable to any exemplary network. For example, in a WiFi network, base stations are equivalent to WiFi access points. Thus, if site sector information and transmit power information are known, enhancements of methods according to embodiments of the present subject matter may be used to enhance the accuracy of the respective location technique. Furthermore, in wireless protocols employing a Timing Advance (TA) parameter, Round Trip Time (RTT) parameter, or equivalent, such information may be used to further enhance performance of the method or system.

Using information regarding active base stations, cell sites, or nodes in an exemplary network, an exemplary method may determine a region of interest R within the network in which a mobile device is to be located. The region R may be the entirety of the network or may be a sub-region(s) of the network. With knowledge of the location of every base station or node with the region R, a grid of geographical locations may be constructed to cover the region. These grid points may be uniformly spaced or generated with circular coordinates by, for example, using a distance from the centroid of the region R and an angular reference. The grid points may also be non-uniformly or randomly spaced throughout the region R and hence may be referred to as non-uniform grid points (NUGs). The grid points may also be non-uniformly or randomly placed in the region R with a higher grid point density in some parts of the region and a lower density in other parts. The density of the grid points may be a factor of topography in the region, cellular density, etc. Using this region R and respective grid points, embodiments of the present subject matter may then generate labels or ranking labels.

For example, labels may be generated in some embodiments using actual mobile device measurements. In such embodiments, for every point (x, y) or geographic location of interest in the region R, there may be m parameters of interest associated with n nodes or base stations. An exemplary calibration database may be populated by examining (by measurement if need be) the relative ranking of each parameter and storing this in the label. For example, in the instance there are six nodes having relevant or measurable parameters at the point (x, y), a set [A B C D E F] may be generated. It follows that the first column of the label may be [C B E D F A] and the second column of the label may be [B E A D C F] whereby, in this example, the first column of the label orders power from highest to lowest, and the second column of the label ranks RTT from lowest to highest as smaller RTTs may carry more information than larger RTTs. These labels, however, are not populated with actual values for either the power or the RTT; rather, the ordering is all that is used. In the case that additional measured or relevant parameters exist, e.g., a TA parameter, another or third column containing simply the site or node with respect to which the TA was obtained can be appended to the label. If the TA was available with respect to more than one site, e.g., sites D and A, and if D>A, then a column [A D] can be included in the label. In the case that a relative angle to a site or several sites using a line joining the mobile device to the serving site as a reference were available, then a further column may be appended to the label so that the label includes the angles in increasing order. It also follows that additional columns may be appended to exemplary labels as further relevant or measurable parameters exist. For example, suppose that the Time Difference of Arrival (TDOA) of a signal at the mobile with respect to a serving site A and any other site is available, a further column may be appended to the label ordering these TDOAs in increasing order [B E D C F]. Additionally, in some embodiments where some group of elements in any of the previously mentioned columns is of equal rank, such a column may be indicated with the equal rank members identified. For example, if the elements [B C] in the label column [A B C D E F] are of equal rank, then the label column may be written as [A [B C] D E F]. This column may then be equivalent to the columns [A B C D E F] and [A CB DE F] both of which may be associated with the same grid point. In such cases one may either use both labels or a compact notation where equal rank members are indicated by grouping within the larger column label. In embodiments where there are more than one such equal rank group, for example if [E F] were equal rank, a non-limiting representation for the label column [A B C D E F] that captures this would be [A [B C] D [E F]]. In alternative embodiments, one may use the set of ungrouped labels {[A B C D E F], [A C B D E F], [A B C D F E], [A C B D F E]} as an equivalent representation for the observables at the respective point (x,y). For the purposes of generating a synthetic calibration database, using the set representation may be more straightforward. Additional embodiments of the present subject matter, however, may focus on cases where the rank is not equal, however, the claims appended herewith should not be so limited.

Thus, in some embodiments of the present subject matter, measurements may be manually performed, e.g., drive testing, at each grid point of interest to populate a calibration database with such labels. In other embodiments of the present subject matter, measurements may be provided by mobile devices in active communication with the wireless network at each grid point of interest to populate a calibration database with such labels. Such active communication may represent an exchange of information between a node in the network and the mobile device, pinging or otherwise, and also may represent the mobile device communicating with another party via a traffic channel. Exemplary columns in the labels may be ranked from largest to smallest or smallest to largest irrespective of the ranking of any other columns, if any, within the label. Therefore, any measurement method that determines or provides a relative assessment of any pair of site parameters at a point (x, y) in the region R may be sufficient to generate an exemplary label. Thus, by selecting any two nodes, one may simply need to know which node has a higher or lower parameter value (or for that matter if the values are equal) whereby the exact value is unimportant. This implies that embodiments of the present subject matter may employ simple equipment that provides a judgment regarding the relative sizes of a particular parameter from two sources sufficient to create any column of the array or label rather than determining exact values for the parameter. In such a manner, embodiments of the present subject matter may provide an exemplary calibration database for a wireless network.

In other embodiments of the present subject matter, a calibration database may be created or built using synthetic ranked labels. In several such embodiments, labels may be generated as a function of distance. For example, at each grid point (x, y) and for each node or base station, the distance from the node to the grid point (x, y) may be determined. These distances may be defined as a set $\{d_i (x, y)\}$ where i denotes the node. The set may then be ordered by increasing distance from the node, so that, in this non-limiting example, the set provides a representation of power. An exemplary label may then be constructed such that the label contains the node identifications (IDs) for all of the nodes where these node IDs are ordered in the same manner as the distances. By way of further example, it may be assumed there are four cellular sites A, B, C, and D in a region R. In this example, the computed distances from a point (x, y) are 0.3 km, 4 km, 2.1 km, and 1.0 km, respectively. It follows that the first column of the label assigned to the point (x, y) may be provided as [A D C B]. In cases where the wireless protocol implements an RTT parameter, a set of RTTs may also be determined under each of the hypotheses that one of the sites or nodes A, B, C, D is the serving site. After appropriate ranking, this RTT label may be represented as [A D C B]. It should be noted in the aforementioned example, that a simple distance to power relationship for the first column was employed and multipath was ignored in the RTT calculation resulting in the synthetic label having two columns with the same order; however, in general this will not be true if multipath and other environmental effects are integrated in embodiments of the present subject matter. At this point, the entire label may be stored and associated with the point (x, y). Labels may then be generated for all such points (x, y) in the region R of interest and may likewise be stored for use in a calibration database.

Additional embodiments of the present subject matter may create or build a calibration database using other methods of generating synthetic ranked labels. For example, focusing attention to those nodes closest to a predetermined grid point (x, y), one exemplary method of constructing a synthetic label evaluates a pair-wise likelihood that one of two sites or nodes has a higher rank than the other. Considering two sites A and B in a set of nearest sites or nodes and focusing on received power, one may pose the question of which of sites A or B is more likely to be received with higher power at (x, y). Of course, other parameters may be employed and the example of received power should not limit the scope of the claims appended herewith. Utilizing such an exemplary, non-limiting parameter-based hypotheses, one of the two sites may be ranked higher than the other site thereby providing a relative ranking between sites A and B. This pair-wise test may be repeated for all BSs, sites or nodes considered relevant to what a mobile device at the grid point (x, y) may be able to perceive. A label may then be obtained that has tagged the grid point with the relative ranks of all nodes of interest, e.g., the label [D A C B] may then be assigned to the grid point (x, y). Such embodiments, may utilize any method of relative parameter ranking of sites taken two at a time (i.e., "pair-wise") to obtain an exemplary label. Thus, instead of using only a distance in other embodiments, a distance may be utilized in a more involved manner where a particular power fall-off model including fading may be applied to compare two sites at a grid point (x, y). Similarly, multipath propagation may be taken into consideration when considering RTT parameters. With such an exemplary power fall off method, columns in exemplary labels corresponding to power and RTT may provide a different ordering.

In additional embodiments of the present subject matter, more than one label for a grid point may be generated using a probabilistic technique. For example, due to the physical variability of a dense urban environment, certain signals should be observed if one were close to a node but may not be observable due to signal blockage. Such blockage may be due to environmental obstacles such as buildings, walls, moving buses, etc. and may result in a random dropping out of certain nodes from a label. To address this, embodiments of the present subject matter may apply a random removal of elements from a label. For example, an exemplary label may be constructed as discussed above as [D F A G H J K], and a random modification applied thereto. To make this effective, the existing label may be duplicated creating N1 duplicates of the label. A probability distribution may then be used, randomly or otherwise, to excise elements from some of the N1 duplicates. In a non-limiting example, a binary distribution for a variable h taking the values 0 and 1 with some fixed probabilities may be employed. On a random trial, if h=0, a particular site may be excised and/or if h=1 then the site may not be excised. Thus, embodiments of the present subject matter may model the randomness of a respective environment directly into the label. By way of further example, the label [D F A G H J K] may, in some instances within the N1 duplicates be modified as [D F G H J K] and [D A G H J K]. To preserve the array format of the label, in the case where one or more elements from a label were probabilistically deleted, a dummy occluded element X may be inserted as the least significant member(s) of any column in the ranked array or label.

While labels have heretofore been described as including only ranked information, claims appended herewith should not be so limited as exemplary labels may also include more specific information in certain columns. For example, in the case of TA, hypothetical or exact TA values may be stored as an additional column or as a third dimension of the respective label. Parameters other than TA may also have hypothetical or exact values stored as an additional column or third dimension of a label and such an example should not limit the scope of the claims appended herewith. Such extra columns or third dimensions including measured or calculated values may constitute a refinement of the claimed subject matter. Other embodiments of the present subject matter may provide a single label, e.g., no accommodation of random behavior in an environment, or multiple labels associated with each grid point (x, y). In some embodiments, multiple labels may be more prevalent in a dense urban environment.

Exemplary labels generated by embodiments of the present subject matter may be appropriately refined. For example, in the instance that a label(s) is generated as a function of distance, e.g., defined as a set $\{d_i(x, y)\}$ where i denotes the node, if the transmit power for each node or base station is known, the transmit power may be utilized to scale up/down the initially computed distances using a predetermined function. For example, a given distance $d(x, y)$ may be converted as $d_{mod}(x, y)=f=d(x,y), P)$ where f (.) represents some function and P represents transmit power for a particular site or node. The modified distances $\{d_{mod}(x, y)\}$ may then be sorted to generate the labels as described above. Columns in the label representing power and/or RTT may thus not provide any necessary ranking relationship to each other. By way of further example, in the instance that a label(s) is generated as a function of distance, e.g., defined as a set $\{d_i(x, y)\}$ where i denotes the node, if the sector information for each node or base station is known, an angle between the sector center line and the line joining a given node to the candidate point (x, y) may be determined as $\alpha$. The distance $d(x,y)$ may then be modified as $d_{mod}(x,y)=g\ (d(x,y), \alpha)$ where g (.) represents some function. These modified distances $\{d_{mod}(x,y)\}$ may then be sorted to generate the labels as described above. Of course, this angle itself may also be utilized as a column in the array or label where the angular separation from the center line is ordered. Using another non-limiting example, in the instance that a label(s) is generated as a function of distance, e.g., defined as a set $\{d_i(x, y)\}$ where i denotes the node, if sector information and power information are both available, labels may be generated using both the previous two examples and, alternatively, a function h(.) may be used to modify the original distance $d(x,y)$ as $d_{mod}(x,y)=h(d(x,y), P, \alpha)$. These modified distances $\{d_{mod}(x,y)\}$ may be sorted and utilized in the power column of the label.

Using a calibration database so generated, a location of a mobile device in the region may be determined. Upon receipt of a location request for a mobile device in the region R, a Position Determining Entity (PDE) may determine a location of the mobile device using information from a Network Measurement Report (NMR) from the mobile device. Generally, an NMR is a message sent by the mobile device to a respective network which includes signal strengths of the surrounding sites and other network observations performed by or on the mobile device. In some embodiments, the NMR may not be constructed solely by the mobile but may include both mobile observations and network observations on the mobile device. The PDE may examine the NMR and based on the power levels, e.g., signal strengths, reported for the sites in the NMR, and may create a candidate label in which the power column has the observed sites in order of decreasing power. For example, a candidate label may have a power column of [D B C F G] where each of B, C, D, F, and G refers to a particular site or node. Additionally the NMR may contain information as to which site is the serving site and corresponding RTTs for as many sites as available. The RTTs, after ranking, may be in the form [C D B F G]. In another embodiment, a column with just one entry, the serving site D, may be appended to the label. To determine the location of the target mobile device, the label database may be examined and searched for all labels that produce a match. This matching may employ one of several, non-limiting distance measures as described below. Labels providing the best match may then point to a set S of grid points, and the location of the mobile device may be generated as a function of the set S, e.g., a centroid of the set S, etc. Of course, other functions may be employed and the disclosure of utilizing a centroid of the set should not limit the scope of the claims appended herewith.

In some embodiments of the present subject matter, a match may be determined by resolving labels in the database that have the smallest label to label distance to the candidate label. For example, given two labels, L1 (in the candidate) and L2 (in a synthetic calibration database at the point (x, y)), the distance measure may be defined as a metric that computes a degree of agreement between labels L1 and L2. Let $D_t(L_1, L_2)$ denote the distance between the labels L1 and L2. Observing that the labels may agree dimensionally, it follows that there should be the same number of columns of the same size in each label. Then $D_t(L1, L2)$ may be written as $$D_t(L_1,L_2)=\Sigma_{i=1}^{N}D_t(L_1(:,i),L_2(:,i)) \quad (2)$$

which represents the sum of the distances between corresponding columns in the labels L1 and L2. Of course, other distance measures or metrics may be utilized to determine the column to corresponding column distances in the labels.

In some embodiments, a Damerau-Levenshtein (DL) distance may be determined and used as a metric. A DL distance is a distance between two strings of finite length determined by counting a minimum number of operations needed to transform one string into the other, where an operation is defined as an insertion, deletion, or substitution of a single site, or a transposition of two adjacent sites. Use of a DL distance in embodiments of the present subject matter may permit a comparison of labels of different length and with any possible rearrangement of the label members. For example, if L1=[A B C D E] and L2=[A C B E] then the DL(L1, L2)=2, since two operations are needed, i.e., transposition and insertion to make L2 equal to L1. That is, L2=[A C B E]→[A B C E]→[A B C D E].

In other embodiments a dynamic programming algorithm may be employed to determine the best possible alignment between the pixels of two images in the stereo vision matching problem. Illustrating the applicability of this dynamic programming algorithm to the label matching problem, let the synthetic label L1=[A B C D E F] and let the target label whose location is desired be L2=[A B D E F]. This may then be expressed in the cost matrix illustrated in FIG. 1. With reference to FIG. 1, an objective of an exemplary dynamic programming algorithm for the label matching problem is to determine the optimal path between the two labels L1 and L2 such that the disparity between the two labels is minimized. Any path from the top left of the cost matrix 100 in FIG. 1 to the bottom right of the matrix 100 provides a specific correspondence of neighboring sites in the target label 110 to neighboring sites in the synthetic label 120. As the matrix 100 is traversed from the top left to the bottom right, a penalty may be assigned, e.g., an Occlusion Penalty (OP) if a neighboring site is mismatched. The cost v(i, j) assigned to each point on the matrix 100 may be defined as $$v(i, j) = \max\begin{Bmatrix} \text{match}(i, j) + v(i-1, j-1) \\ OP + v(i-1, j) \\ OP + v(i, j-1) \end{Bmatrix} \quad (3)$$

Thus, an overall cost metric or distance may be determined as the sum of all v(i, j) along the best possible path. Such an exemplary cost metric may be determined for each target label and/or synthetic label pair and the location associated with the synthetic label that best matches the target label (e.g., identified by the minimal associated cost) may be the desired location estimate of the mobile device.

In various embodiments of the present subject matter, a Label Matching (LM) distance measure may also be employed to determine any agreement between two labels. For example, for a power type parameter positions in the label columns to be compared are more consequential the closer they are to the root (top position) of the label (i.e., the strings are considered hierarchical). In such a case, transport costs may be defined that are associated with moving an element up or down in a column vector where $t_{ij}$ represents the cost incurred to transport a string from the $i^{th}$ position to the $j^{th}$ position. Such costs may be higher to transport elements higher up in the label. Commencing the process of comparison of the two columns at each position, it follows that the total cost incurred would be the sum of transport costs incurred at each position. The target column whose location is desired may thus be evaluated against each candidate label in the database, and the candidate label that yields the minimum metric (e.g., the closest to the target label) may be selected as the location estimate. In the event that multiple such candidates exist, then the centroid of corresponding locations may be selected as the desired location estimate. Experimentally, drive-test data was collected in a region where two mobile device were used in the test set-up to collect the reported NMR measurements. This data was used to create a label database whereby the ordering of the neighbor sites was used to create the labels as described above. A GPS receiver attached to the set-up recorded the ground truth associated with all the NMRs. A portion of the collected data (approximately 20%) was set aside as target data whose location would be desired. The data was then grouped based on the labels (the properties of the data designated as target was not used for label-based grouping), and then the target NMRs were examined by comparing the target label with those in the database and an LM distance metric determined. The location corresponding to the minimum metric was selected as the desired location estimate of the target and location error, determined as the difference between the estimated location and the true location of the target, and was stored for each target record. Table 1 provides statistics of the experimental location error.

TABLE 1

| | |
|---|---|
| 50th percentile error | 40.4 meters |
| 67th percentile error | 74.1 meters |
| 90th percentile error | 154.5 meters |
| 95th percentile error | 195.2 meters |
| 99th percentile error | 290.2 meters |

Figure 2:
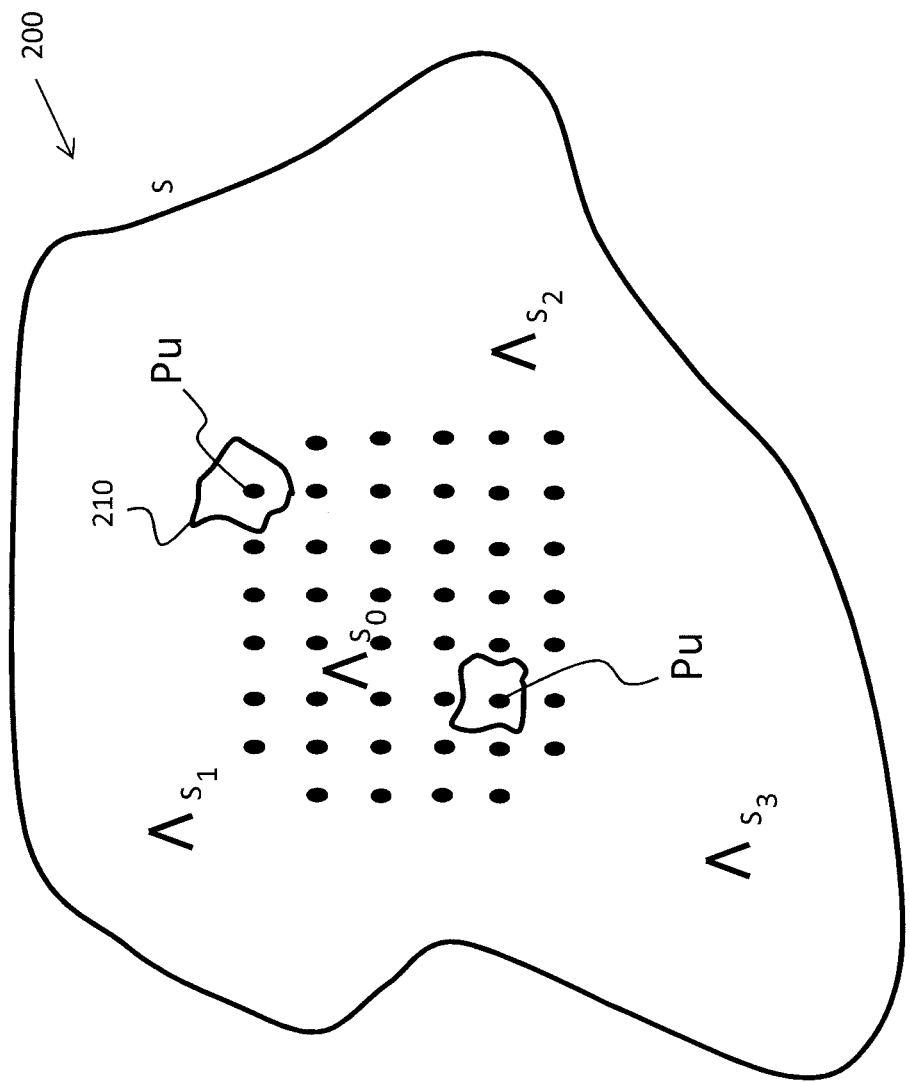
FIG. 2 is an illustration of a network according to embodiments of the present subject matter.

Additional embodiments of the present subject matter may employ disjointed regions in label space to create synthetic data. FIG. 2 provides an illustration of a network according to an embodiment of the present subject matter. With reference to FIG. 2, considering the space S of all possible labels in a given wireless network or market, columns in an exemplary label may have a length N1, N2, . . . , Nm (i.e., the label may possess m columns of differing lengths). Assuming that the power column of the label has a length N, then it follows that the entire space S includes all groupings of possible length N1, N2, . . . , Nm vectors expressing every possible permutation Ni of i sites taken at a time from the entire set of sites in the network. This would equate to a large space. The labels L generated from the calibration data, if available, would belong to some subset of S. In the instance where there is only a power parameter in the label corresponding to a power column of length N, then the space will be the set of all permutations of i sites taken at a time from the set of sites, also a large number. Thus, some embodiments of the present subject matter may select synthetic labels from a disjoint set {S-L}. Further, suppose a single synthetic label is created such that it is the same as a label already in L and this synthetic label is then to some grid point that has not yet been calibrated. If this label is determined as the label to be matched in a location request, two matching locations are provided, one in the already calibrated region and one which used a synthetic procedure to create a label. The argument may be made that a synthetic label assigned to some grid point P2, at least on average, will not be a better fit than the same label assigned to a grid point P1 by actual calibration.

Uncalibrated regions 210 in the network 200, however, may be assigned unique labels from the set {S-L}. A specific application of this concept would be to examine the calibration data available for a network and determine the set of all possible labels that could have existed but did not. This determination may be performed by keeping the serving site S0 fixed and permuting the neighboring sites to determine if any of the permuted labels provide a match in the calibration data with the same serving site. If any of the permuted labels do not provide a match in the calibration data, then one or more disjoint labels exist. Since the serving site was fixed, the region may be restricted where the new disjoint labels are to be assigned to some region around the serving site, and then the disjoint labels may be associated with a most likely location in that region where calibration data is not available. Label matching should not be degraded with the existing calibrated label database so long as labels from the disjoint set are assigned as such. Thus, for every uncalibrated grid point Pu, one may look at the disjoint set and find the most likely assignment of Pu to a label in {S-L}. This label should then be removed from the disjoint set and included in the set {L}. Such an exemplary process may be repeated until all uncalibrated grid points are either calibrated or assignable labels from the disjoint set are exhausted. By way of example, it may be assumed there are three sites S1, S2 and S3 in a region around a serving site S0. Drive-testing in this area results in calibration data having the following labels: L1=[S0 S1 S2 S3]; L2=[S2 S0 S1 S3]; L3=[S0 S3 S1 S2], where the sites are ordered by decreasing power. In this example, some portions of the network are uncalibrated, and these uncalibrated areas 210 will be filled using the disjoint label concept described above.

To generate the synthetic label data for the uncalibrated region 210, a set of labels given the existence of the three sites S1, S2, S3 in the region S of interest should be constructed. It may also be assumed that the serving site S0 should be either the most powerful or the second most powerfully received site, which is generally the case in most applications. The set of all possible labels S may be defined as:

$$S = [S0\ S1\ S2\ S3; S0\ S1\ S3\ S2; S0\ S2\ S1\ S3; S0\ S2\ S3 \\ S1; S0\ S3\ S2\ S1; S0\ S3\ S1\ S2; S1\ S0\ S2\ S3; S1\ S0 \\ S3\ S2; S2\ S0\ S1\ S3; S2\ S0\ S3\ S1; S3\ S0\ S2\ S1; S3 \\ S0\ S1\ S2]$$

(4)

A set of possible labels that could have existed in the calibration data L but did not may then be constructed and defined as the set {S-L}:

$$S-L = [S0\ S1\ S3\ S2; S0\ S2\ S1\ S3; S0\ S2\ S3\ S1; S0\ S3\ S2\ \\ S1; S1\ S0\ S2\ S3; S1\ S0\ S3\ S2; S2\ S0\ S3\ S1; S3\ S0\ \\ S2\ S1; S3\ S0\ S1\ S2] \quad (5)$$

Even in such a simplistic example, nine synthetic labels may be assigned without negatively affecting the existing capability of the label matching location. As the number of sites in the label increases, the size of the disjoint subset is likely to increase, offering a larger pool of candidate labels to be used in synthetic matching Potential locations in the region of interest to which labels from the set {S-L} may be assigned may then be determined. For example, a search for the locations where these labels may be assigned is narrowed as the serving site was fixed. As previously mentioned, there may be areas in the vicinity of S1 that does not have calibration data. Examining the set {S-L}, it may be observed that the synthetic label [S1 S3 S2] may be assigned to all locations in this small area. Labels assigned to uncalibrated regions 210 in a network 200 may thus be disjoint from the labels generated from calibration data. Thus, when a location request comes in for a target NMR, an exemplary location estimation process may proceed by pattern matching target data with any calibration data and a metric to ascertain the quality of the estimated location. If the metric is below a predetermined threshold, the target data may then be pattern-matched with synthetic data. Since the labels generated for calibrated and uncalibrated regions were selected to be disjoint, the estimated location should not be ambiguous.

Figure 3:
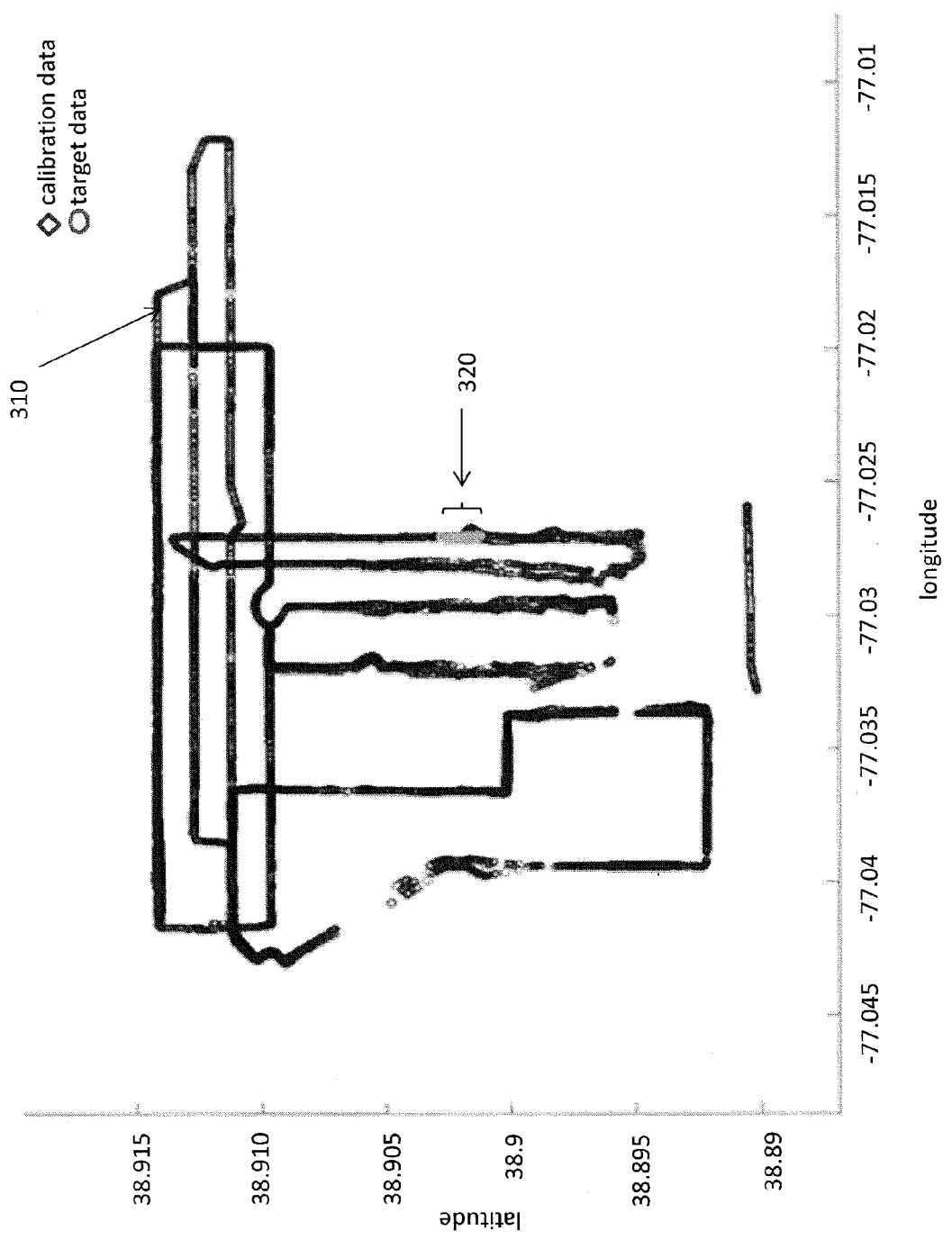
FIG. 3 is an illustration of an exemplary disjoint label embodiment using field data.

FIG. 3 is an illustration of an exemplary disjoint label embodiment using field data. With reference to FIG. 3, calibration measurement data was collected in a network using a mobile device connected to a laptop. The mobile device supplied NMR measurements to the laptop and a GPS receiver connected to the laptop recorded the GPS location at the instant of each NMR measurement. These recorded measurements were then post-processed to illustrate the disjoint label embodiment. The calibration data 310 was then plotted on a map and a target area 320 identified for analysis. All calibration data records inside this region 320 were stripped thereby simulating an uncalibrated space in the respective network, and these records were designated as the target NMRs whose location was desired. Synthetic labels were then generated using the disjoint label process described above. The set S was determined which represents the set of all possible labels from the calibration data. A set L was identified which represents the set of all labels that exist in the calibration data. A disjoint set {S-L} was then determined which represents the set of all labels that could potentially have existed but did not. The synthetic labels thus generated are disjoint from the labels that exist in the calibration data.

Synthetic labels that may be assigned to the uncalibrated region 320 may then be determined. The search for the synthetic labels that may be assigned to the uncalibrated region is narrowed since the serving site for locations in the uncalibrated region Su will be known; hence, each of the synthetic labels with the serving site Su may be assigned a location that is a function of the location of the uncalibrated region. For example, each of the synthetic labels may be assigned to the centroid of the uncalibrated region. The target NMR labels may then be pattern-matched with the generated synthetic labels using a LM distance measure or other measure. In this instance, the resulting location error statistics provided a 50$^{th}$ percentile error of 68 m and a 95$^{th}$ percentile error of 90 m.

Figure 4:
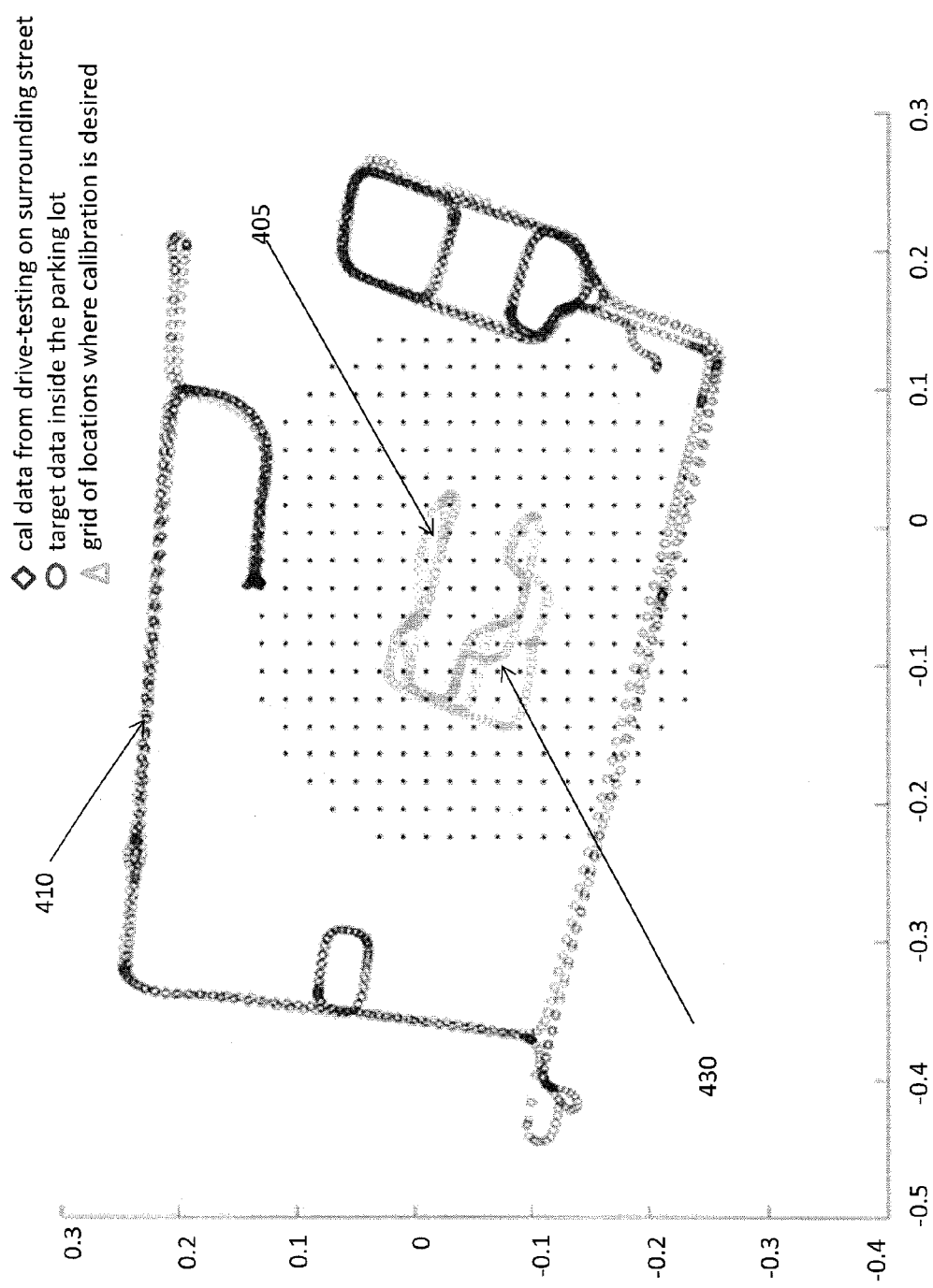
FIG. 4 is an illustration of another exemplary disjoint label embodiment using other field data.

FIG. 4 is another illustration of an exemplary disjoint label embodiment using other field data. With reference to FIG. 4, a location problem with a parking lot 405 and surrounding streets 410 is provided. Conventionally, one would drive through the streets with RF equipment and collect calibration data, but would avoid driving into the parking lot to record RF signatures. Thus, in the absence of calibration data for locations inside the parking lot 410 (either via drive-testing or synthetic assignment), a conventional pattern-matching algorithm that attempts to locate a target inside the parking lot using calibration data from surrounding streets would typically place the target on the street closest to the target NMR pattern, which in this case would be a few hundred meters from the true target location. Embodiments of the present subject matter, however, may assign synthetic calibration data to locations inside the parking lot and thereby locate target requests that originate inside the parking lot without affecting the location of target requests that originate from the surrounding streets. In such an embodiment, a disjoint label set for each serving site in the target area where synthetic calibration is desired may be generated. This may represent a set of labels that could have existed in the calibration data but did not. The disjoint labels may then be assigned to locations in the grid 430 where synthetic calibration is desired. For example, these labels may be assigned to the centroid of the grid 430 of locations where synthetic calibration is desired. In general, the goal of any calibration process would be to calibrate as much of the network coverage area as possible. Thus, in an urban environment it may be reasonable to assume that pockets of uncalibrated regions exist for a given coverage area that will be sufficiently farther from other uncalibrated areas so the associated labels will be unique. An exemplary location estimation process may then pattern match the target NMR with the calibration database from drive-testing or using measurements from mobile devices in active communication. If a match occurs with a reasonably good metric, it may be returned as the desired location, else the process may proceed with pattern matching the target NMR with the generated synthetic calibration data. In the aforementioned example, it was found that about 75% of the target data inside the parking lot had labels that were different from the calibration data on surrounding streets, and thereby found a match in the disjoint label set. The average location error for about 75% of the target data (approximately 6000 records) was found to be less than 80 m. The location error was therefore far reduced compared to what would have reported had the nearest calibration data point been used in the absence of synthetic calibration data.

In embodiments where a plurality of regions exist that are uncalibrated and hence require synthetic label assignment, exemplary methods may generate a disjoint label set and then determine a best assignment of synthetic label(s) to each uncalibrated region. For example, for a given serving site and for a given (x, y) location, a particular ranked label(s) set may be more (or less) likely based on a distance measure than other labels in the disjoint set. Once a ranked label or set of ranked labels has been assigned to a location, this set may then be pruned from the disjoint set prior to investigating other locations for synthetic label assignment. Such an exemplary algorithm would then be complete once all uncalibrated locations have been assigned synthetic labels or no additional synthetic labels exist in the disjoint set.

Figure 5:
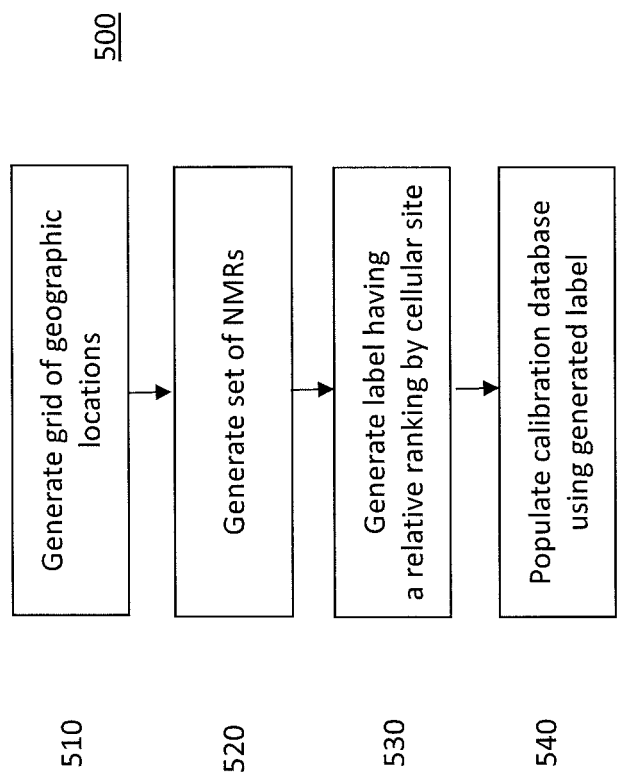
FIG. 5 is a diagram of one embodiment of the present subject matter.

FIG. 5 is a diagram of one embodiment of the present subject matter. With reference to FIG. 5, a method 500 of generating a calibration database in a communications network is provided. The method 500 may include generating a grid of geographic locations to cover a region in a communications network having a plurality of cellular sites at step 510, and generating a set of NMRs for the region at step 520, the NMR being a collection of measurement parameters observed at selected geographic locations in the grid. Exemplary grids may be, but are not limited to, geographic locations or points uniformly or randomly spaced in the region. Exemplary measurement parameters may be, but are not limited to, power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof. The NMR may represent, in some embodiments, a single vector of observed measurement information, multiple vectors of observed measurement information, or a single vector representing multiple vectors of observed measurement information. Further, the set of NMRs may include NMRs having measurement parameters observed by the mobile device or observed by the network. At step 530, a label may be generated representing a first measurement parameter observed from ones of the plural cellular sites at one of the selected geographic locations, the label including a relative ranking by cellular site of the first measurement parameter. In further embodiments, step 530 may include collecting calibration data from drive testing to obtain an NMR and/or collecting calibration data from mobile devices in active communication in the communications network to thereby obtain an NMR. The label may include a plurality of columns, each column representing a relative ranking by respective cellular site of a different measurement parameter. At step 540 a calibration database may then be populated for the communications network using the generated label. In some embodiments, step 540 includes populating a calibration database for the communications network using the generated label and actual measurement parameters observed in the region. In various embodiments, the method includes modifying the relative ranking of the generated label as a function of a second measurement parameter. In cases where at least two rankings of sites in the label are of equal rank, some embodiments may include the step of dividing the label having equal ranked sites into two columns, each of the two columns having the same ranking of respective sites but with the two equal ranking sites transposed in the two columns, or providing the label with a subset indicating the sites which have an equal rank.

Figure 6:
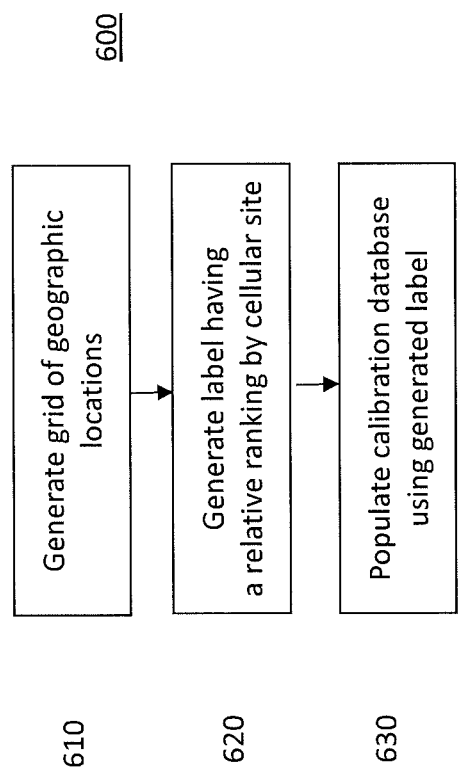
FIG. 6 is a diagram of another embodiment of the present subject matter.

FIG. 6 is a diagram of another embodiment of the present subject matter. With reference to FIG. 6, a method 600 of generating a calibration database in a communications network is provided. The method 600 may include generating a grid of geographic locations to cover a region in a communications network having a plurality of cellular sites at step 610. Exemplary grids may be, but are not limited to, geographic locations or points uniformly or randomly spaced in the region. At step 620, a label may be generated representing a first parameter between a selected geographic location and ones of the plural cellular sites, the label including a relative ranking by cellular site of the first parameter. In some embodiments, step 620 includes determining a set of distances from ones of the plural cellular sites to the selected geographic location, ordering the set as a function of increasing distance from the selected geographic location, and generating a label having cellular site identifications as a function of the ordering. In other embodiments, step 620 includes determining a set of hypothetical round trip times from ones of the plural cellular sites to the selected geographic location, ordering the set as a function of increasing distance from the selected geographic location, and generating a label having cellular site identifications as a function of the ordering. In additional embodiments, step 620 includes determining a hypothesis between two of the plural cellular sites with respect to the selected geographic location as a function of a measurement parameter, determining a relative ranking between the two cellular sites as a function of the determined hypothesis, iterating these steps for additional cellular sites proximate to the selected geographic location, and generating a label having cellular site identifications as a function of the determined relative rankings. Exemplary parameters or measurement parameters may be, but are not limited to, power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof. The label may include a plurality of columns, each column representing a relative ranking by respective cellular site of a different parameter. At step 630 a calibration database may then be populated for the communications network using the generated label. In some embodiments, step 630 includes populating a calibration database for the communications network using the generated label and actual calibration data observed in the region. In various embodiments, the method includes modifying the relative ranking of the generated label as a function of a second measurement parameter. In cases where at least two rankings of sites in the label are of equal rank, some embodiments may include the step of dividing the label having equal ranked sites into two columns, each of the two columns having the same ranking of respective sites but with the two equal ranking sites transposed in the two columns, or providing the label with a subset indicating the sites which have an equal rank.

FIG. 7 is a diagram of a further embodiment of the present subject matter. With reference to FIG. 7, a method 700 of determining the location of a mobile device in a communications network is provided. The method 700 may include generating a grid of geographic locations to cover a region in a communications network having a plurality of cellular sites at step 710. Exemplary grids may be, but are not limited to, geographic locations or points uniformly or randomly spaced in the region. At step 720, an NMR may be received for a target mobile device, and a candidate label generated at step 730 as a function of a first measurement parameter in the received NMR, the candidate label including a relative ranking by respective cellular site of the first measurement parameter. Exemplary measurement parameters may be, but are not limited to, power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof. At step 740, a calibration database populated by a plurality of labels may be provided, each label including a relative ranking by cellular site of actual measurement parameters observed in the region or hypothetical parameters. These labels (candidate or otherwise) may include a plurality of columns, each column representing a relative ranking by respective cellular site of a different parameter. At step 750, the candidate label may be compared with ones of the plural database labels, and an estimated location of the mobile device determined as a function of the comparison at step 760. In some embodiments, step 750 may include matching the candidate label with one or more database labels as a function of a distance measure. In one such embodiment, a quality of the match may be determined and if such quality is below a predetermined threshold then the embodiment may match the candidate label with a database label generated as a function of a hypothetical parameter. Exemplary distance measures may be a function of a disjoint set between the compared labels or may be a Damerau-Levenshtein distance, an optimal distance, a label matching distance, other suitable distance metrics, and combinations thereof. In additional embodiments, step 760 may include determining the estimated location as a function of a set of geographic locations which correspond to the matching labels. In one such embodiment, the estimated location may be the centroid of corresponding geographic locations. In cases where at least two rankings of sites in the label are of equal rank, some embodiments may include the step of dividing the label having equal ranked sites into two columns, each of the two columns having the same ranking of respective sites but with the two equal ranking sites transposed in the two columns, or providing the label with a subset indicating the sites which have an equal rank.

While the discussion above has referenced certain exemplary networks, the disclosure herein should not be so limited. For example, the principles discussed herein are equally applicable to other networks such as, but not limited to, a UMTS network, a TDMA network, CDMA network, a WiMax network, a WiFi network, networks utilizing EDVO, a CDMA2000 network, and 1xRTT standards or another equivalent networks or other networks that may include a system clock or equivalent. Such exemplary system clocks may thus be utilized by embodiments of the present subject matter to determine timing relationships relevant herein.

The present disclosure may be implemented by a general purpose computer programmed in accordance with the principals discussed herein. It may be emphasized that the above-described embodiments, particularly any "preferred" or exemplary embodiments, are merely possible examples of implementations, merely set forth for a clear understanding of the principles of the present subject matter. Many variations and modifications may be made to the above-described embodiments of the present subject matter without departing substantially from the spirit and principles of the present subject matter. All such modifications and variations are intended to be included herein within the scope of this present subject matter.

Embodiments of the subject matter and the functional operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, or declarative or procedural languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a Global Positioning System (GPS) receiver, to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the subject matter described herein may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, input from the user may be received in any form, including acoustic, speech, or tactile input.

Embodiments of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this description may contain many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As shown by the various configurations and embodiments illustrated in FIGS. 1-7, various embodiments for a system and method for mobile location using ranked parameter labels have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of generating a calibration database in a communications network comprising the steps of:
    (a) generating a grid of geographic locations to cover a region in a communications network having a plurality of cellular sites;
    (b) generating a set of network measurement reports (NMRs) for the region, the NMR being a collection of measurement parameters observed at selected geographic locations in the grid;
    (c) generating a label representing a first measurement parameter observed from ones of the plural cellular sites at one of the selected geographic locations, the label including a relative ranking by cellular site of the first measurement parameter; and
    (d) populating a calibration database for the communications network using the generated label,
    wherein at least two rankings of sites in the label are of equal rank, and dividing the label having equal ranked sites into two columns, each of the two columns having the same ranking of respective sites but with the two equal ranking sites transposed in the two columns.

2. The method of claim 1 wherein the step of populating the calibration database further comprises populating a calibration database for the communications network using the generated label and actual measurement parameters observed in the region.

3. The method of claim 1 wherein the grid of geographic locations are uniformly spaced in the region.

4. The method of claim 1 wherein the grid of geographic locations are randomly spaced in the region.

5. The method of claim 1 wherein the step of generating a set of NMRs further comprises collecting calibration data from drive testing to thereby obtain an NMR.

6. The method of claim 1 wherein the step of generating a set of NMRs further comprises collecting calibration data from mobile devices in active communication in the communications network to thereby obtain an NMR.

7. The method of claim 1 wherein the measurement parameter includes a parameter selected from the group consisting of power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof.

8. The method of claim 1 wherein the NMR represents a single vector of observed measurement information, multiple vectors of observed measurement information, or a, single vector representing multiple vectors of observed measurement information.

9. The method of claim 1 wherein the label further comprises a plurality of columns, each column representing a relative ranking by respective cellular site of a different measurement parameter.

10. The method of claim 1 further comprising the step of modifying the relative ranking of the generated label as a function of a second measurement parameter.

11. The method of claim 1 wherein the set of NMRs includes NMRs having measurement parameters observed by the mobile device or observed by the network.

12. A method of generating a calibration database in a communications network comprising the steps of:

(a) generating a grid of geographic locations to cover a region in a communications network having a plurality of cellular sites;
(b) generating a label representing a first parameter observed between a selected geographic location and ones of the plural cellular sites, the label including a relative ranking by cellular site of the first parameter, including:
   (i) determining a set of distances from ones of the plural cellular sites to the selected geographic location;
   (ii) ordering the set as a function of increasing distance from the selected geographic location; and
   (iii) generating a label having cellular site identifications as a function of the ordering;
and
(c) populating a calibration database for the communications network using the generated label.

13. The method of claim 12 wherein the measurement parameter includes a parameter selected from the group consisting of power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof.

14. The method of claim 12 wherein the step of populating the calibration database further comprises populating a calibration database for the communications network using the generated label and actual calibration data observed in the region.

15. The method of claim 12 wherein the grid of geographic locations are uniformly spaced in the region.

16. The method of claim 12 wherein the grid of geographic locations are randomly spaced in the region.

17. The method of claim 12 wherein the parameter includes a parameter selected from the group consisting of power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof.

18. The method of claim 12 wherein the label further comprises a plurality of columns, each column representing a relative ranking by cellular site of a different parameter.

19. The method of claim 12 wherein at least two rankings of sites in the label are of equal rank.

20. The method of claim 19 further comprising the step of:
   (i) dividing the label having equal ranked sites into two columns, each of the two columns having the same ranking of respective sites but with the two equal ranking sites transposed in the two columns, or
   (ii) providing the label with a subset indicating the sites which have an equal rank.

21. The method of claim 12 further comprising the step of modifying the relative ranking of the generated label as a function of a second parameter.

22. The method of claim 12 further comprising the steps of:
   (d) receiving a network measurement report (NMR) for a target mobile device;
   (e) generating a candidate label as a function of the first measurement parameter in the received NMR, the candidate label including a relative ranking by respective cellular site of the first measurement parameter;
   (f) comparing the candidate label with the generated label; and
   (g) determining an estimated location of the mobile device as a function of the comparison.

* * * * *